United States Patent [19]

Weber

[11] 4,300,090
[45] Nov. 10, 1981

[54] DIRECT CURRENT POWER SUPPLY

[76] Inventor: Harold J. Weber, 20 Whitney Dr., Sherborn, Mass. 01770

[21] Appl. No.: 16,932

[22] Filed: Mar. 2, 1979

[51] Int. Cl.³ .............................................. G05F 3/02
[52] U.S. Cl. .................................. 323/311; 323/237; 323/267; 307/11
[58] Field of Search ........................................ 323/8-9, 323/22 SC, 24, 34-37, 22 Z, 223, 237, 267, 300, 311; 307/11, 30-34, 252 B, 252 J, 252 N, 305; 363/86, 128

[56] References Cited

U.S. PATENT DOCUMENTS

| | | | |
|---|---|---|---|
| 3,242,416 | 3/1966 | White | 323/22 Z |
| 3,355,650 | 11/1967 | Tolmie | 323/8 |
| 3,399,333 | 8/1968 | Canter | 323/24 X |
| 3,663,943 | 5/1972 | Nakajima et al. | 323/22 SC |
| 3,790,856 | 2/1974 | Hutchinson | 323/8 X |
| 3,798,470 | 3/1974 | Burns et al. | 323/22 SC |
| 3,878,434 | 4/1975 | Voorhoeve | 323/22 SC |
| 4,118,768 | 10/1978 | Wilson, Sr. | 363/128 X |

*Primary Examiner*—William M. Shoop
*Assistant Examiner*—Peter S. Wong

[57] ABSTRACT

Direct Current power supply for providing a relatively low stabilized d.c. voltage from a relatively high a.c. voltage primary power source without the use of a transformer. The d.c. value is developed across a variable impedance device coupled substantially in series with the current path established between the source of a.c. power and a functional load coupled to the source of a.c. power. Through effective control of the variable impedance so as to be at a minimum value, e.g. low impedance, through one half-cycle of the a.c. waveform and further to purposefully effect a high impedance through a small part of the second half-cycle whereupon it changes to a condition of low impedance, a stable unidirectional current flow is established in a secondary circuit which is filtered and results in a stabilized direct current power source well suited for supplying low demand circuits as typified by solid-state control circuits employing transistors and integrated circuits; microprocessors; low power amplifiers, oscillators, and timers; and other such devices.

11 Claims, 14 Drawing Figures

DIRECT CURRENT POWER SUPPLY

BACKGROUND OF INVENTION

Low voltage d.c. power sources are widely used in manufactures of many different kinds. Most known low voltage d.c. power supplies, when operated from a source of, for example, utility line voltage (e.g., 117 volts, 220 volts, etc.) employ the well known step-down transformer, rectifier, and usually feedback regulator circuit means so as to provide a d.c. voltage having good constancy and relative freedom from line voltage excursions. Such means are oftimes expensive and complex when compared to the product in which they are intended to find application. A real need exists, which my invention serves to satisfy, for an inexpensive, small, easy to mass-produce low d.c. voltage power supply which has good stability characteristics and high efficiency. In particular, the desirability for such a d.c. power supply is ever-increasing as solid-state controls, for example microprocessors or the like, reach into lower priced mass-produced consumer products.

In an earlier U.S. Pat. No. 3,355,650 Tolmie describes an arrangement for delivering a nominal d.c. value to a motor e.g., electric shaver or the like) from an a.c. mains which may vary. However, the inherent stability of the so-produced d.c. voltage is poor relative to what is required to satisfy more demanding electric loads, such as presented by control circuits including a microprocessor or the equivalent. This instability is described in the "SCR Manual Including Triacs and Other Thyristors", fifth edition 1972 publication ETRC-3875B by Semiconductor Products Department, General Electric Co., Syracuse, N.Y. 13201. Chapter 4.10, page 93 paragraph 2 particularly describes the phenomenon: "The transfer function is very non-linear and repeatibility of setting is not possible either with different SCR's or with temperature due to $I_{GT}$ variation." The "transfer function" describes the point where the SCR turns "on" when the only source of gate current is a substantial resistance coupled to the anode thereof. The class of triggering described therein is also that taught by Tolmie. In addition, the arrangement brings about a premature device failure mode whenever the SCR current rating is cost effectively near the a.c. load demand. The cause is well described in the "Thyristors, Rectifiers, and Diacs" databook SSD-206A 1973 edition published by R.C.A. Solid State Division, Box 3200, Somerville, N.J. 08876. Reference to page 438, paragraph 2 which effectively says that: ". . . it is always advantageous to provide a gate current pulse that has a magnitude exceeding the d.c. value required to trigger the device." While on page 442, paragraph 1 states: "Although the circuit is capable of providing variable power to the load, it is heavily dependent on the gate current distribution, and results in uncontrolled conduction angles for a given value of gate series resistance." The instant invention overcomes these earlier difficulties, through the novel inclusion of an abrupt breakdown voltage responsive means coupled directly between the anode and the gate of the s.c.r., or its equivalent, so as to provide rapid infusion of gate current once the threshold of the voltage responsive means is reached. This action provides a highly stable unipolar interrupter signal which is filtered as a source of constant d.c. potential, while at the same time serves to deliver the remaining part of the a.c. power cycle to the a.c. load work function without any important loss of effectiveness.

My invention's teachings derive the low d.c. voltage directly from the primary power line, thus there is no inherent isolation as might be provided by oridinary power supplies using transformers. The invention proposes, however, that in cost-effective products this presents no particular technical problem and any disadvantages are offset by cost savings, as line voltage operated relay controllers, timers, and the like have been used for years without difficulty. Furthermore radio, television, phonograph and other consumer oriented products are known to have employed direct connection between the a.c. primary line and the internal workings.

In the most basic expression of my invention merely five circuit elements, employed in novel arrangement, serve to acheive performance results which prior to my finding would require substantially more complicated and costly apparatus.

SUMMARY OF INVENTION

A power supply is described which provides a stable source of low direct current voltage by way of utilizing a small portion of the alternating current cycle of an a.c. load terminated a.c. source. Operation is dependent upon the action of a variable impedance means or the like coupled between the a.c. source and the a.c. load, and the resultant effect of interrupting the current flow between the a.c. source and the a.c. load for a small percentage of at least one half of each full a.c. cycle, thereby diverting the voltage developed across the variable impedance interrupting mechanisim through a secondary current path means which serves to charge an energy storage capacitor to an average d.c. value.

A high speed switch, such as a thyristor, is used as the interruptor mechanism. The switch will repeatedly commutate, or effectively open, when the alternating current potential across the switch is near zero value, whereupon through at least some part of one half of the full a.c. cycle it will remain effectively open, or at a higher impedance value, until the a.c. peak voltage developed across the switch reaches a finite magnitude, whereupon the switch will turn-on, or close, thereby appearing as a low impedance which serves to decrease the drop across the switch to a minimum value. During the brief period occurring between zero a.c. value and the finite value where switch-over occurs from the higher to the lower impedance value, a substantially unidirectional potential is developed across the switch means which serves to pulse charge a storage, viz filter, capacitor, the combination thereby producing a source of d.c. potential exhibiting good constancy.

Therefore the prime object of my instant invention is to teach a d.c. power supply which develops its value by way of diverting but a small portion of the power intrinsic in at least a part of one half of the full a.c. cycle in a current path between a source of a.c. power and an a.c. power load.

Another important object of my invention is to provide a d.c. power supply which operates off of but a small portion of the current flowing in an a.c. power circuit with the value of the developed d.c. level being substantially independent of nominal variation in either current or voltage in the a.c. source.

Another significant object of my invention is to provide a d.c. power supply which requires no magnetic components, e.g. transformers or the like, in its implementation and yet is capable of providing relatively low d.c. voltage values having good constancy from a source of relatively high voltage a.c. power having poor regulation.

Still another object of my invention is to develop a low d.c. value having good regulation from a source of poorly regulated high a.c. value whilst maintaining good conversion efficiency, compact size, and minimum circuit cost.

Yet another object of my invention is to give rise to a means which will develop more than one relatively stable low voltage d.c. value from a common high voltage a.c. source and load circuit means and having a wide latitude for any combination of voltage, current, and frequency instability in the a.c. source and load circuit.

A remaining object of my invention is to teach the use of a thyristor as a switch means substantially arranged in series connection between an a.c. source and an a.c. load, whereby the thyristor appears as an open circuit, or high impedance, through at least a few electrical degrees of at least one half of each a.c. full cycle, whereafter the thyristor is turned on, or effective as a low impedance, by a voltage responsive means, as for example a zener diode, throughout the balance of the interrupted a.c. half cycle resulting in good a.c. load continuity with the a.c. source while yet providing at least one unilateral potential during the open circuit period, as developed across the thyristor, which serves to charge an attendent energy storage capacitor the result of which is to provide a secondary circuit d.c. source of power.

DESCRIPTION OF INVENTION

Figure 1:
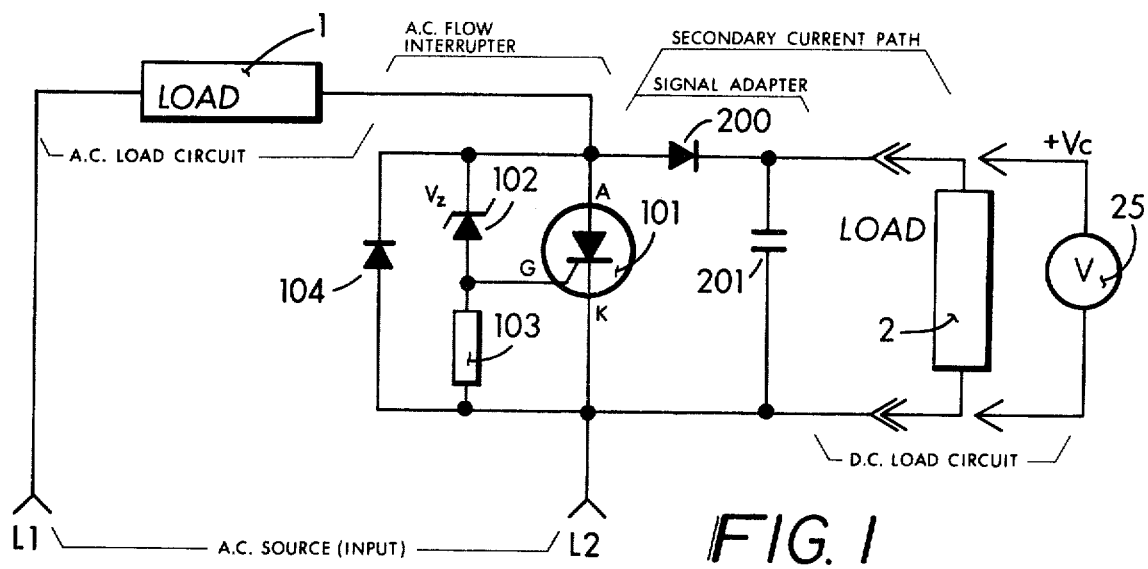
FIG. 1 The use of an unilateral thyristor switch element is shown together with a separate alternate half-cycle bypass diode.

A load means 1 is shown in FIG. 1 to connect on one end to primary power line L1, while the other end connects in the main through thyristor means 101 to primary power line L2. With a primary power source of alternating current, for example a source of typical 60 hertz (50 hertz) utility power, connected between L1 and L2, circuit operation is believed to behave as herein described. On the half-cycle when L2 is positive with respect to L1, power will pass directly to the load except for a minor junction drop across the diode 104, that being on the order of 0.7 volts with the usual diode. However on the alternate half-cycle when input line L2 swings negative with respect to line L1, the diode 101 will not conduct. Furthermore, the thyristor 101 which acts as a circuit interrupter will not conduct until the gate of the thyristor, which is held near the cathode potential by anti-leakage swamping resistor 103, receives ample current to initiate turn-on. What happens is as the primary voltage increases in value from zero, the voltage on the anode of the thyristor 101 will proportionately increase as a a positive value with respect to the cathode.

This increase in voltage, or interrupter signal, continues until the zener breakdown diode 102 conducts, producing an abrupt increase of current flow in the gate circuit of the interrupter means thyristor 101. This causes the thyristor to conduct, and the primary line L2 will connect directly to the load throughout the rest of the power half-cycle.

With a typical zener diode 102 value of 6.8 volts, by way of example, the interrupter signal voltage across the thyristor will increase at least to:

$$E_1 = V_z + E_{GK}$$

where:

$E_1$ = voltage across thyristor at turn-on
$V_z$ = zener breakdown voltage
$E_{GK}$ = thyristor gate to cathode voltage at turn-on prior to turn on state; therefore for the cited example, where $V_z$ = 6.8 volts and $E_{GK}$ may be 0.7 volt, $E_1$ will equal about 7.5 volts.

This interrupter signal voltage $E_1$ couples through diode 200 to a charge holding, viz filter capacitor 201 and serves as a signal adaptive means. The result is that a stable d.c. voltage level, the magnitude of which is near the value $V_z$, will be developed across the capacitor 201, thereby serving to energize load means 2. As shown, a voltmeter 25 may be connected across the load 2 and read the developed d.c. value.

The practitioner of my art will recognize that, with typical a.c. primary line voltage 117 volts (root mean square) the peak voltage will approximate 165 volts; therefore with the typical zener value of 6.8 volts as described, the ratio relative to the line voltage is small, meaning the percentage of d.c. imbalance or power loss presented to the load will be negligible in the majority of practical applications for my teachings, being in the cited example only around 4% of the half cycle value.

Furthermore, with the example given in a circuit wherein the filter capacitor 201 is on the order of 150 microfarads, an available current of 25 milliamperes or more at a d.c. potential around 6 volts may be expected.

Figure 2:
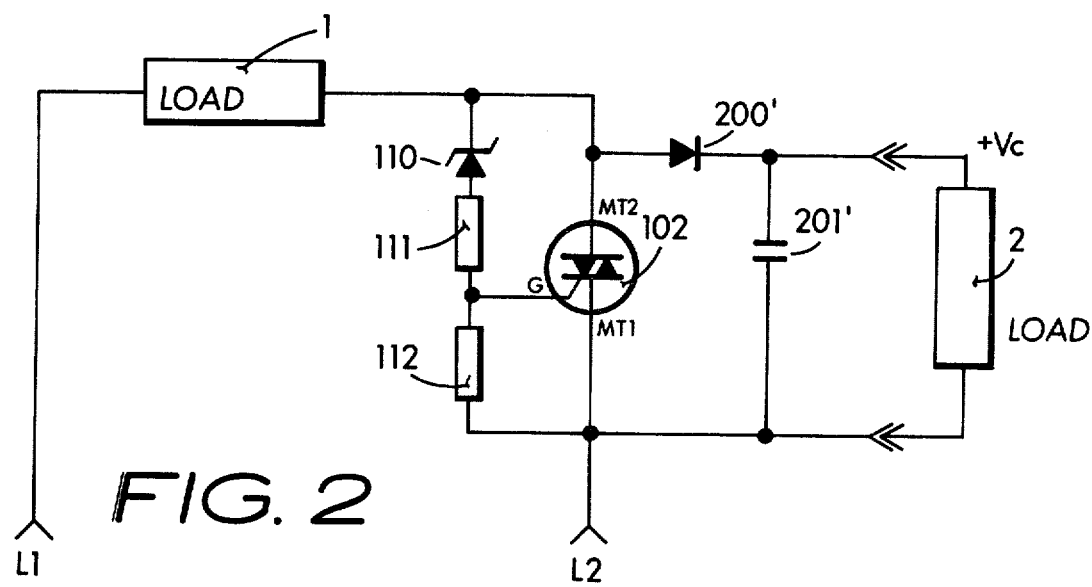
FIG. 2 The use of a bilateral thyristor providing full first half-cycle a.c. power conduction and controlled second half-cycle a.c. power conduction.

A bilateral thyristor, or Triac, is shown in FIG. 2. The thyristor 102 connects between the input line L2 and the load 1 and functions as an interrupter means. On the power half-cycle when L2 is positive, the gate of the thyristor 102 connects directly to the main terminal two (MT-2) as connected to the load, by diode 110 which is forward conducting through peak current limiting resistor 111, say 35 ohms, thereby causing the thyristor 102 to conduct essentially over the full half-cycle. Resistor 112 serves as a gate leakage swamping resistor, being on the order of 470 ohms.

When input L2 receives the alternate negative half-cycle, diode 110 operates as a breakdown, or zener avalanche, diode thereby effecting a belated turnon of the thyristor until the voltage increases across the thyristor to the breakdown value $V_z$ for the selected zener diode, whereupon current is abruptly coupled to the thyristor gate electrode. For example, with a 1N753 diode, a value of about 6.2 volts, plus the $V_{GT}$ (e.g., the gate to MT-1 drop) is required. This interrupter signal voltage is coupled to the signal adaptive means including diode 200' coupled to energy storage, or filter capacitor 201 and is available for supplying the load 2. With a filter capacitor of 270 microfarads, and using a 1N753 zener diode as described, the supply has satisfactorily supplied 5.8 volts at a load of 25 milliamperes.

Figure 3:
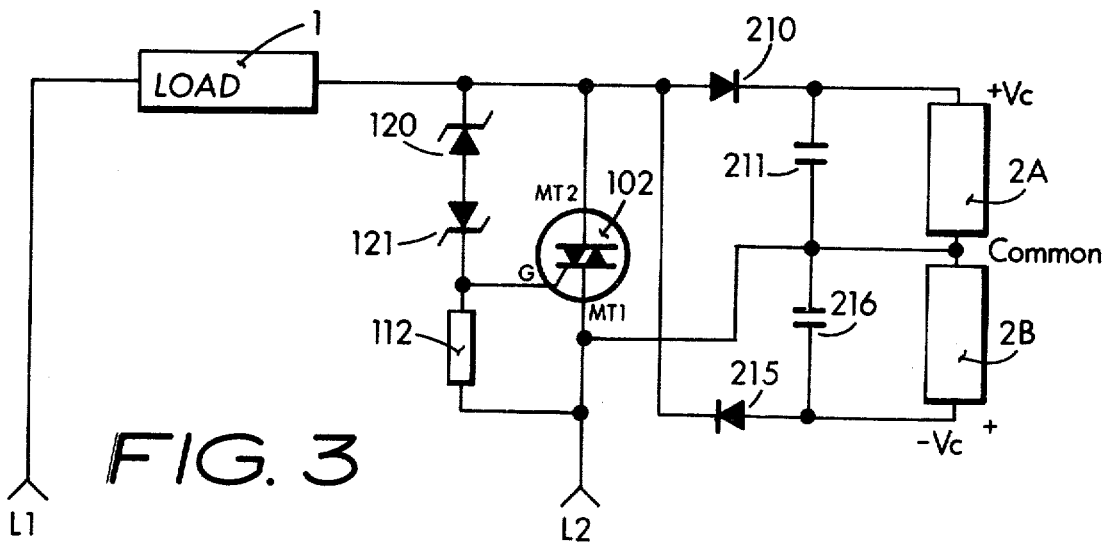
FIG. 3 A bilateral thyristor provides double controlled alternate half-cycle a.c. power conduction and develops at least two d.c. output levels.
Figure 4:
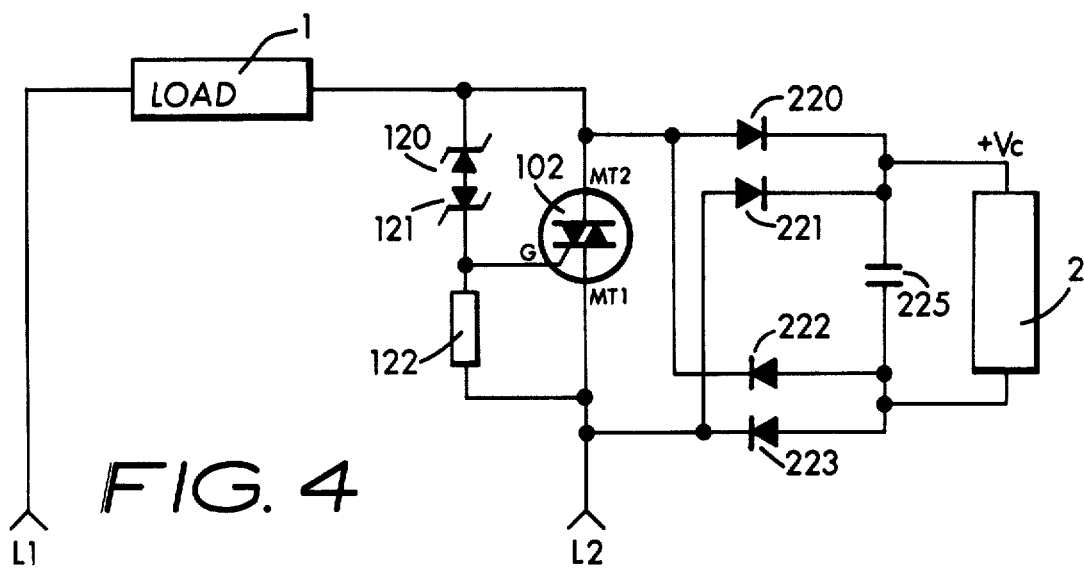
FIG. 4 A double controlled bilateral thryistor combined with a bridge rectifier provides double recurrence charging of the d.c. energy storage capacitor.

A dual polarity voltage power supply means is shown in FIG. 3. A bilateral thyristor 102 is caused to have retarded turn-on by way of the back-to-back zener diode arrangement 120, 121. As shown, the resulting d.c. voltage positive value will be for the most part determined by the avalanche characteristics of zener diode 120 whilst the negative value will be mainly set by the breakdown value of zener diode 121.

When MT-2 of thyristor 102 goes positive to the value pre-established by zener 120, the d.c. value will be coupled by diode 210 to filter capacitor 211. Conversely, when MT-2 of thyristor 102 goes negative to the value pre-established by zener 121, the d.c. value will be coupled by diode 215 to filter capacitor 216.

The resulting positive value $+V_c$ and negative value $-V_c$ developed across the filter capacitors couples to the respective d.c. loads 2A, 2B. From this teaching an artisian will quickly conclude that a variety of positive and negative d.c. levels may be obtained, since the individual value is determined by the intrinsic voltage breakdown value of each of the zener diodes 120, 121 and may be purposefully different.

Figure 5:
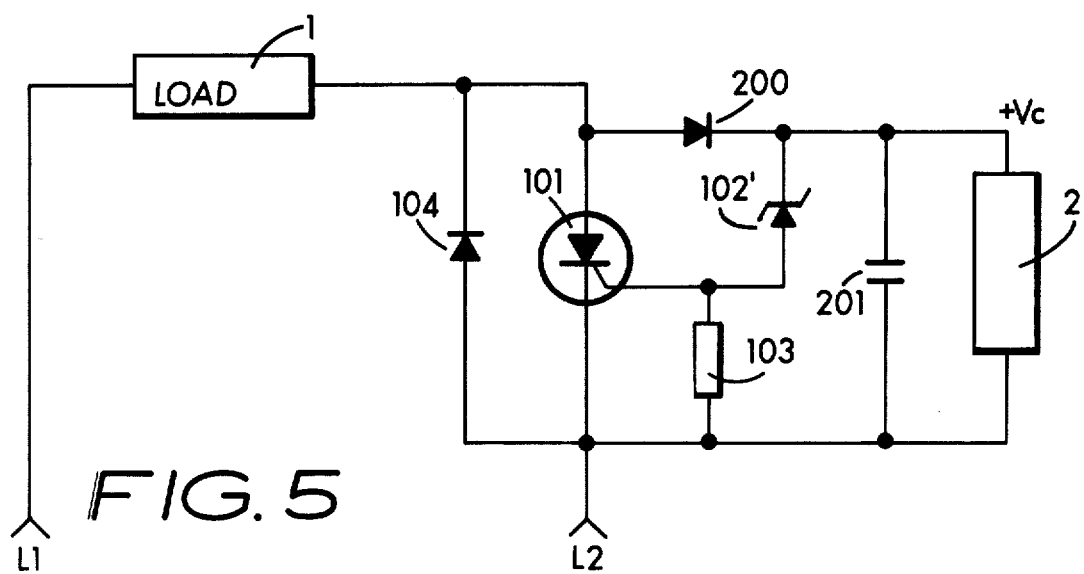
FIG. 5 The position of the voltage level sensing breakdown diode is shown changed over the arrangement of FIG. 1 to a position directly supplied by the average d.c. output voltage.

Full-wave utilization of the primary power is depicted in FIG. 5. In the previous cited examples relative to FIG. 1 and FIG. 2, half-wave primary power utilization is employed, with the result that considerable time (e.g., 16.67 mS for 60 hertz; 20 mS for 50 hertz) elapses between charge pulses for the filter capacitor. The result is the capacitor has to be larger and more costly to acheive a particular level of performance. Through the effective expedient of employing four low voltage diodes, only three more than otherwise needed in FIG. 2; together with an additional zener diode as in FIG. 3, considerable improvement in regulation and ripple reduction may be obtained. The four diodes 220, 221, 222, 223 connect as a bridge rectifier between the thyristor 102 and the filter capacitor 225, therefrom to the load 2.

The output d.c. voltage is about the sum of the individual zener 120, 121 values, expressed as:

$$V_c \approx E_1 + E_2 = (V_{Z1} + V_{Z2}) + 2E_T$$

where:
$E_1$ = voltage across thyristor at turn-on for first half cycle;
$E_2$ = voltage across thyristor at turn-on for second half cycle;
$V_{Z1}$ = Zener 120 breakdown voltage;
$V_{Z2}$ = Zener 121 breakdown voltage; and,
$E_T$ = thyristor gate trigger voltage to MT-1.

The avalanche diode 102' is connected between the d.c. value coupled from the thyristor 101 anode by diode 200 and the thyristor gate in the depiction of FIG. 5. The result is the gate-firing of the thyristor is determined by the maximum d.c. level, not the instantaneous peak anode voltage. The effect is some reduction in the dynamic impedance of the power supply thereby effecting an improvement in regulation.

Figure 6:
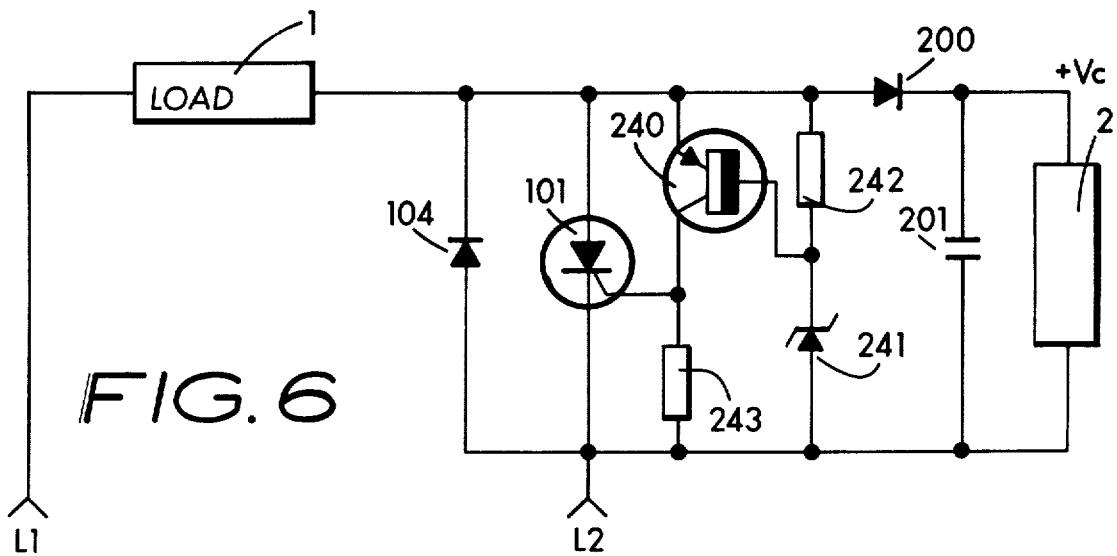
FIG. 6 The use of a transistor gain element interconnected between the breakdown diode and the thyristor gate is shown.

A dynamic, viz amplified, control means appears in FIG. 6. A PNP transistor 240 (2N6076 for example) is connected with the emitter to the $+V_c$ line and the collector to the thyristor 101 gate. When the $+V_c$ d.c. value across the filter capacitor 201 is low, e.g. less than the zener 241 breakdown value, the transistor 240 base is pulled to the emitter by resistor 242 (say 680 ohms) resulting in no collector current flow, the ensuring effect of which is to cause the gate of the thyristor 101 to be pulled to the cathode potential by way of resistor 243 (say 3,900 ohms). The thyristor will not conduct, producing a positive voltage transfer through diode 200 which, a knowledgeable artisian will understand, serves to charge capacitor 201. When the charge on the capacitor 201 rises to a value where the avalanche diode 241 reaches zener breakdown, base current will be caused to flow in transistor 240, the intrinsic gain of which will produce substantial collector current, thereby producing an abrupt gate current increase in the thyristor 101, subsequently causing it to conduct, or turn-on, and thereby inhibiting any further charging of capacitor 201.

Figure 7:
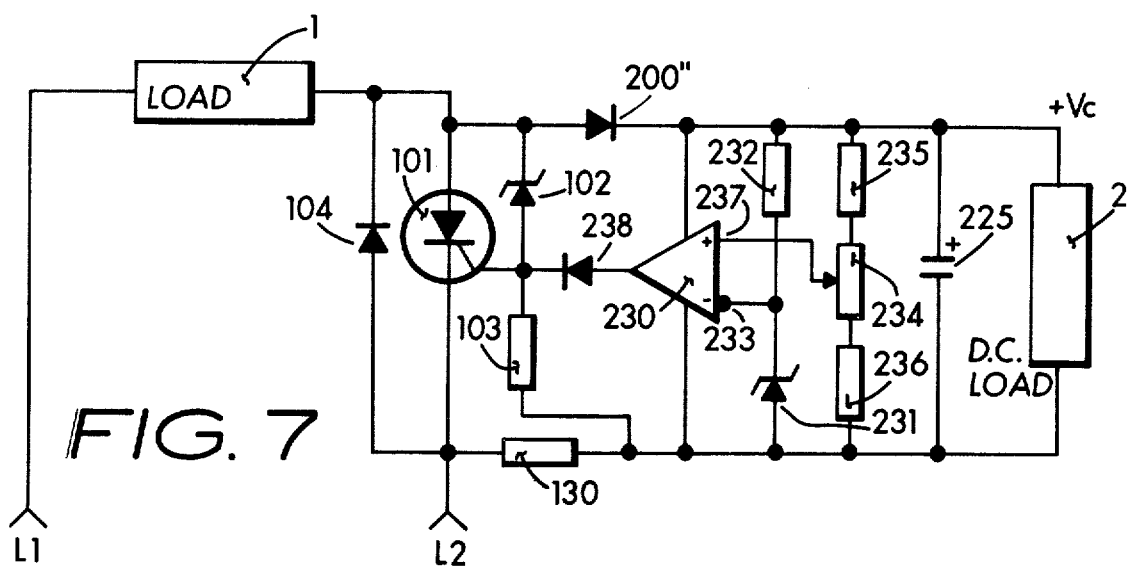
FIG. 7 A voltage comparator serves to provide a d.c. voltage output relatively independent of the absolute value of the breakdown diode.

The gain of an operational amplifier 230, connected as a voltage comparator, provides enhanced performance of the circuit depicted in FIG. 7. As shown the thyristor 101, breakdown diode 102, swamping resistor 103 and alternate half-cycle pass diode 104 function as described for FIG. 1. except that the breakdown diode 102 is selected to have a value substantially higher than the normal operating d.c. output value expected from the circuit. The breakdown diode 102 functions, in this arrangement, as an over-voltage protection diode and, therefore, may be deleted in some applications to save cost. Diode 102 may for example have a zener value of say 15 volts. The constancy of the actual d.c. output voltage is determined principally by zener diode 231, as connected to the inverting input of operational amplifier 230 (say type CA-3140) along with zener ballast resistor 232. The amplifier 230 non-inverting input, e.g. "+" input, serves to connect to a voltage divider including resistors 235, 236 and usually potentiometer 234. The actual d.c. voltage provided by the power supply is determined by the ratio of the resistance $R_M$, being that between the potentiometer 234 arm and $+V_c$ including resistor 235; and resistance $R_N$, being that between the potentiometer 234 arm and $-V_c$, including resistor 236; shown as:

$$V_{DC} = V_{ZR}\left(\frac{R_M + R_N}{R_N}\right)$$

where:

$V_{DC} = +V_c$ output level; and $V_{ZR}$ = Avalanche voltage for zener reference diode 231.

As long as $+V_c$ as ratioed, e.g. divided, and connected to input 237 of amplifier 230 is of a value LOWER than the zener reference value on input 233, the amplifier output will be minimum, near zero or $-V_c$. The result is no substantial current will conduct through steering diode 238 into the gate of the thyristor 101, until the aforesaid zener 102 conducts. The resultant positive value developed across the thyristor 101 will couple through diode 200", serving to charge capacitor 225. Depending on the value of the capacitor 225, one or more a.c. cycles may occur before the d.c. value thereon accumulated rises sufficiently to cause the positive value on amplifier 230 input 237 to exceed than on input 233. When this does occur, the amplifier 230 output will drive to near $+V_c$, thereby turning "on" the thyristor and stopping further capacitor 225 charging through the rest of any particular a.c. cycle.

A resistor 130 serves to current limit the d.c. output and can best be understood if one considers that all of the d.c. current passes through the resistor. The drop produced in the resistor, when it is of low value say 0.47 ohm, will be negligible for normal power supply output currents typified by 25 to 50 mA or so. However if a fault current occurs (shorted output, etc.) the drop across the resistor will increase until the gate of the thyristor 101 is effectively positive by the path through resistor 103. Thus the thyristor will turn-on, negating any further current flow during the normal charge half-cycle. The action is repetative for every half-cycle until the fault is removed, thus providing effective current fault limiting.

Figure 8:
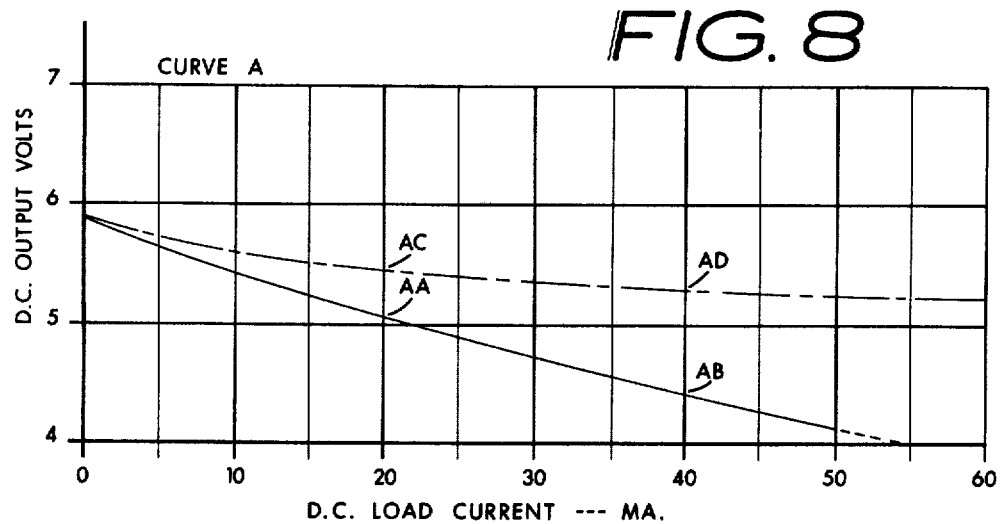
FIG. 8 Plot showing voltage regulation performance with change in current load for the circuit described in FIG. 1.

The performance curve for a particular embodiment of my invention appears in FIG. 8. What is shown is the change in $+V_c$, or d.c. output volts, with any change in d.c. load current for the circuit arrangement described in FIG. 1. Two curves appear on the plot: that curve including points AA, AB wherein the value of capacitor 201 is 270 microfarads (uFD); and that curve including points AC, AD wherein the value of capacitor 201 is 820 uFD. The zener diode 102 is a 1N753 (6.2 $V_z$) and the thyristor is a C106B. The range between points AA, AB and AC, AD represents a 2:1 change in d.c. current. With the example between points AC, AD the measurement shows only a change from 5.45 to 5.3 d.c. volts as current doubles from 20 to 40 mA d.c. This is merely a 2.75% change in voltage for a 2:1 current change: thus the essence of the invention is illustrated, that being a voltage stable power supply comprising a modest arrangement of inexpensive elements.

Figure 9:
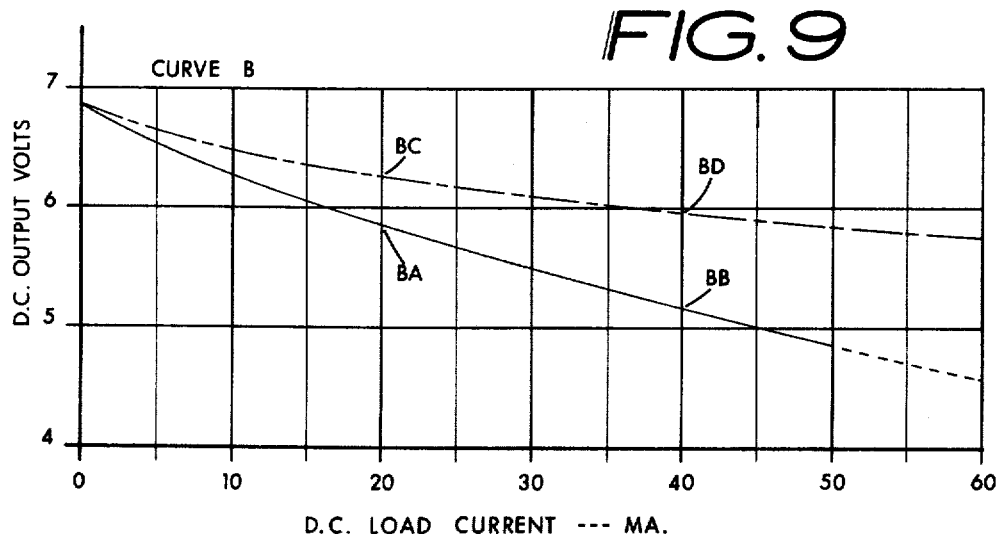
FIG. 9 Plot showing voltage regulation performance with change in current load for the circuit described in FIG. 2.

In a like way FIG. 9 shows the measured performance for a particular embodiment of the circuit described in FIG. 5. As before, the range between points BA, BB and BC, BD bounds a 2:1 current change and demonstrates what good regulation is achievable. In this configuration, capacitor 201 is 200 uFD for curve BA, BB and 500 uFD for curve BC, BD. The zener diode 102 is a 1N753.

Figure 10:
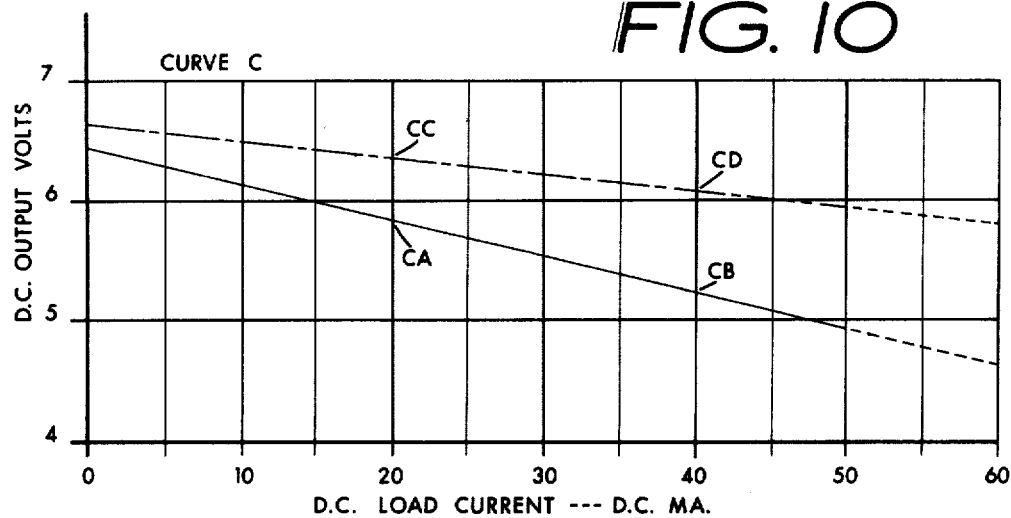
FIG. 10 Plot showing the tracking and voltage regulation performance with change in current load for the dual output circuit described in FIG. 3.

The teaching of the circuit for FIG. 6 is shown in the curves appearing in FIG. 10. As before, the two curves encompass points CA, CB for a capacitor 201 value of 200 uFD, and points CC, CD for a capacitor 201 value of 500 uFD.

Figure 11:
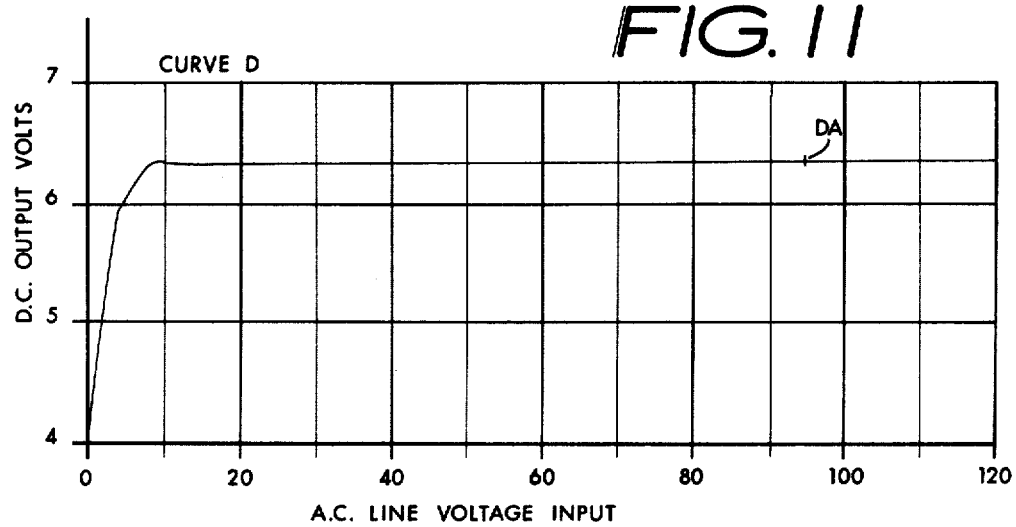
FIG. 11 Plot showing output voltage regulation with change in the input a.c. voltage value for circuit described in FIG. 1.

Line voltage effects on the d.c. output of the circuit shown in FIG. 6 appears in the curve of FIG. 11. The value for capacitor 201 is 500 uFD with a load current of 20 mA. The point DA represents the usual 95 volt accepted "minimum" line voltage which may be expected from the typical 117 volt a.c. source. The a.c. load is a 100 watt incandescent lamp bulb. One novel improvement the artisian will realize from my teachings is that higher line voltage, e.g. 230 volts or more, have no material effect on the performance of my device. Furthermore, in the circuit as in FIG. 1, the peak reverse voltage $V_{ROM}$ across the thyristor is negligible, being on the order of the forward junction drop of diode 104, whilst the diode reverse voltage $V_{RM}$ is on the order of the value of the breakdown potential of zener 102. Thus it becomes obvious from my teachings that lowest cost, low peak-reverse voltage semiconductors perform well in the circuit.

Figure 12:
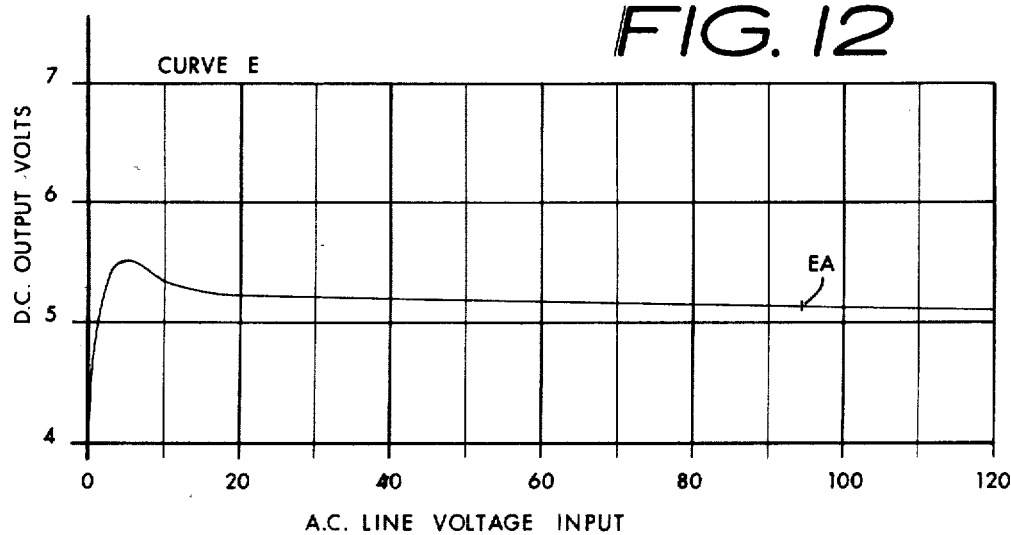
FIG. 12 Plot showing output voltage regulation with change in the input a.c. voltage value for circuit described in FIG. 6.

FIG. 12 depicts the measured performance for the circuit of FIG. 5 with a C201 value of 200 uFD and a load current of 40 mA d.c. The a.c. load is a 100 watt lamp. What is shown in each FIG. 11 and FIG. 12 is the extraordinary insensitivity to line voltage variation inherent in my new invention.

Figure 13:
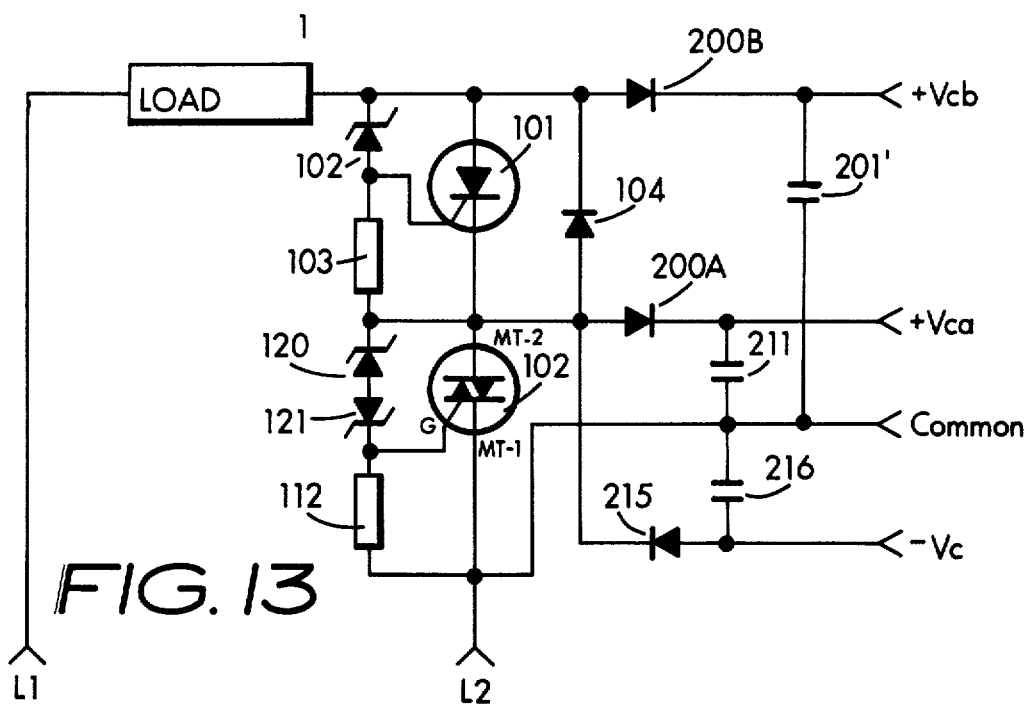
FIG. 13 The series arrangement of two power supply elements is shown in an arrangement which will result in a multiplicity of d.c. output values.

A multiple value d.c. output power supply, that is one providing more d.c. level values than taught by FIG. 3, is shown in FIG. 13. In effect what I give the art as novel in this teaching is the series arrangement, or stacking, of two or more of my aforesaid power supply forms. The artisian will quickly realize that the depicted power supply comprises two earlier described power supply variants, that of FIG. 1 and that of FIG. 3. The result is that in addition to the negative $-V_c$ and positive $+V_{ca}$ value shown as to be provided in a method similar to the like outputs for earlier FIG. 3, this supply provides a second positive $+V_{cb}$ value somewhat higher in voltage than $+V_{ca}$. What occurs in the interrupter signal effected by the thyristor (triac) 102 is rectified by either diode 200A for $+V_{ca}$, or else diode 215 for $-V_c$. At the same time, the interrupter signal effected by thyristor (s.c.r.) 101 is rectified by diode 200B so as to develop voltage $+V_{cb}$. Since thyristor 101 is effectively in series with thyristor 102, MT-1 of device 102 being "common", three distinct voltage values are produced.

Figure 14:
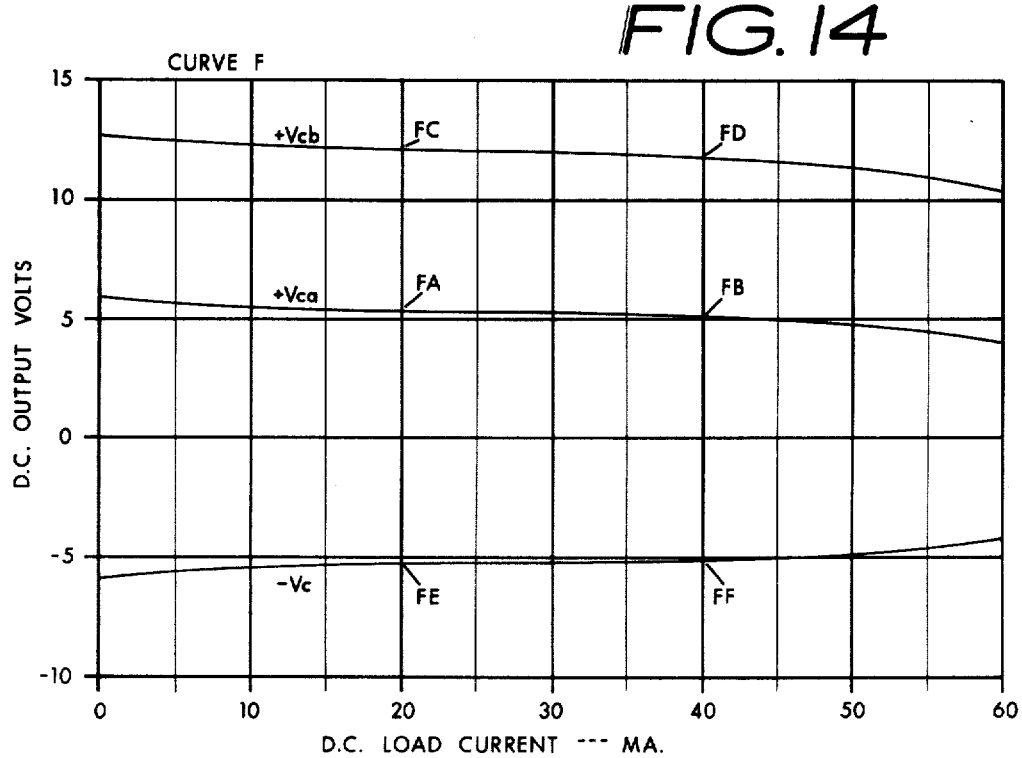
FIG. 14 Plot showing voltage regulation with change in load current for a particular embodiment of the circuit described in FIG. 13.

FIG. 14 provides a plot of a particular embodiment of the multiple value power supply which finds application for providing power to an integrated circuit device such as the ubiquitous type 8080A microprocessor, for example. Zener diode 102 is exampled as a 1N756 (8.2 $V_z$), whilst diodes 120, 121 are each type 1N752 (5.6 $V_z$). Each output capacitor 201', 211, and 216 is 1 millifarad. The curve F shows three distinctive plots for $+V_{ca}$, $+V_{cb}$, and $-V_c$. The points between FA, FB; FC, FD; and FE, FF on each plot represents a 2:1 current change, giving a showing of how very little current changes affect the output voltage.

While my teachings give example of particular combinations of active and passive components and values, the practitioner will understand that any of a very large combination of element values may be employed with similar results and yet not deviate from the essence of my invention.

My teachings provide a d.c. power supply capable of providing low d.c. voltages in the range of around 1 volt to about 15 volts d.c., more or less, with a current capability from near zero to around 100 or more milliamperes d.c. The exact values for circuit operation are best selected by the artisian with consideration as to the character of the cooperative d.c. load means, and therefore, such values do not provide substance as to establishing limits on the scope of my instant invention.

The term a.c. source shall include source means of any frequency what-so-ever within the operating limits of the thyristor selected for the task at hand, e.g. 50 hertz, 60 hertz, 400 hertz, etc.

The term a.c. source further defines a waveform envelope which has no significant d.c. component, viz goes through a polarity reversal during a substantial part of the cycle period. Commercial utility power is a good example.

While it will be obvious to an artisian in the field, I will specify that the a.c. source waveform shall have a rate of rise (e.g., leading edge rise time) which is a substantial portion of 90 electrical degrees of the operative a.c. half-cycle. This is to say, the waveform is best as a sinusoidal, triangular, or sawtooth waveshape. A good squarewave, having fast rise times, such as generated by certain kinds of inverter circuits and by particular classes of constant voltage regulators will require waveform shaping by way of a filter or the like in order to acheive best performance from my teachings.

The cascade connection, viz series arrangement, of two or more thyristors is contemplated as being a method for developing a plurality of more than two distinctly different output d.c. values. Therefore the implementation of such an arrangement to develop, say $-5$, $+5$, and $+12$ volts d.c., would be ordinary practice of my new teachings.

The compound connexion of two unilateral acting thyristors, e.g. the inverse parallel connective arrangement, for the purpose to produce more than one d.c. output value is considered an expediential application for the teachings of FIG. 1. This particular embodiment variation includes that arrangement wherein the cathode of one thyristor couples to the anode of the other and each thyristor is acted upon in a substantially separate way by a zener diode or like control means effectively coupled cooperatively between the anode and the gate of each thyristor, thereby usually producing a separate interrupter signal value for each half of the a.c. cycle.

The arrangements taught in my instant invention have been modelled as encapsulated forms, with the interconnective circuitry being a printed circuit board. The combination has then been impregnated with a plastic substance to effect a module assembly about 40 millimeters long, 30 millimeters wide, and only about 12 millimeters thick, with leads extending therefrom. As such the module weight is about one ounce.

What I claim is:

1. Power supply means adapted to provide a stable source of direct current power from a substantially unstable alternating current source means, including in combination:
   a. a source of alternating current (a.c.);
   b. an a.c. load means;
   c. a.c. flow interrupter means including an input effectively coupled to said a.c source and an output effectively coupled to said a.c. load means, producing at least a state of high impedance and low impedance therebetween, said high impedance effective to substantially interrupt the alternating current power flow between the said input thereto and the said output therefrom, thereby producing an interrupter signal substantially between the said input and the said output for at least a small percentage of at least one half of each successive acted upon full a.c. cycle, with the so-produced interrupter signal magnitude having an instantaneous retarded value which is substantially proportional to the value of the a.c. source signal modified by the ratio of the impedance through the a.c. load means effectively in series with the impedance of a d.c. load means;
   d. control means including a voltage responsive means coupled to said interrupter means and operative therewith to abruptly induce said state of low impedance thereacross when the said interrupter signal magnitude reaches a predetermined value, thereby limiting said interrupter signal magnitude to at least not substantially exceed said predetermined value, whereby further said low impedance effects a maximum coupling of a.c. power between said source and said a.c. load; and,
   e. secondary current path means, coupled to said interrupter means, further including signal adaptive means operative with said interrupter signal so as to provide a substantially stable, and usually low, direct current (d.c.) value therefrom at an output terminal means.

2. Power supply means as in claim 1 wherein said a.c. flow interrupter means includes a thyristor class semiconductor device including at least a first terminal serving as an input thereto, a second terminal serving as an output therefrom, and a third terminal serving as a gate means for establishing a state of low impedance in at least one direction between the said first terminal and the said second terminal.

3. Power supply means as in claim 1 wherein said a.c. flow interrupter means includes a thyristor class semiconductor device including at least a first terminal serving as an input thereto, a second terminal serving as an output therefrom, and a third terminal serving as a gate means for establishing a state of low impedance in at least one direction between the said first terminal and the said second terminal; wherein further is included at least one breakdown diode connected effectively between the said thyristor said second terminal and said third terminal, said novel combination being conjunctively operative so that when the instantaneous a.c. voltage appearing between the said second terminal and said third terminal reaches a magnitude sufficient to cause zener mode conduction of the breakdown diode, the third terminal will abruptly receive a control signal of such efficacy as to produce an immediate state of low impedance between the first terminal and the second terminal.

4. Power supply means as in claim 1 wherein said a.c. flow interrupter operates to inhibit a.c. flow in but one direction and includes in combination:
   a. thyristor device of the unilateral class, e.g. a silicon controlled rectifier or the like, having at least a cathode, an anode, and a gate;
   b. unilateral conductive device, viz a diode or the like, including at least a cathode and an anode, operative to pass current in but one direction therebetween;

c. arrangement whereby said thyristor and said diode are connected in inverse parallel, that being the cathode of one device connects to the anode of the other device; and, d. control means coupled to said unilateral thyristor said gate and operative therewith to cause said thyristor to conduct when the said interrupter signal value in the said secondary current path exceeds a predeterminative magnitude.

5. Power supply means as in claim 1 wherein said a.c. flow interrupter operates to controllably inhibit a.c. flow in each of two directions and includes in further combination:

a. thyristor device of the bilateral class, e.g. triac or the like, having at least a main terminal one, a main terminal two, and a gate;

b. control means coupled to said bilateral thryistor said gate and operative therewith to cause said thyristor to conduct in either direction when the value of the said interrupter signals in the said secondary current path exceed predetermined magnitudes.

6. Power supply means as in claim 1 wherein said a.c. flow interrupter operates to controllably inhibit a.c. flow in the first direction and to substantially enable full a.c. flow in the second direction and includes in further combination:

a. thyristor device of the bilateral class, e.g triac or the like, having at least a main terminal one, a main terminal two, and a gate;

b. control means coupled to said bilateral thyristor said gate and operative therewith to cause the said thyristor to conduct substantially over the first full half cycle, and to conduct over the second half cycle when the said interrupter signal value in the said secondary current path exceeds a predetermined magnitude.

7. Power supply as in claim 1 wherein said secondary current path means includes control means coupled to said interrupter means and operative therewith to cause cessation of the interrupter signal when the signal adaptive means output value exceeds predetermined magnitude.

8. Power supply means as in claim 1 wherein said secondary current path includes a plurality of signal adaptive means the purposeful result of which is to provide more than one d.c. output value, usually including different polarity.

9. Power supply means as in claim 1 wherein said secondary current path means includes a control means coupled to said interrupter means and is operative therewith to cause cessation of the interrupter signal when the signal adaptive means output value exceeds predetermined value and includes in further combination:

a. d.c. fault current limit sensor means;

b. coupling means between said d.c fault current limit sensor and said control means; the effective combination of which results in a fault current limit signal which acts to reduce the interrupter signal to a value determined by the said d.c. fault current limit sensor means.

10. Power supply means as in claim 1 wherein said voltage responsive means is effectively coupled between said interrupter means and said secondary current path means, operative therewith to induce said state of low impedance within said interrupter means when said d.c value increases to at least a predetermined level.

11. Power supply means as in claim 1 wherein said control means includes an amplifier means coupled with said voltage responsive means and essentially effective therewith to increase the effective abrupt response to the said predetermined value of said interrupter signal.

* * * * *